US008805743B2

(12) United States Patent
Bantz et al.

(10) Patent No.: US 8,805,743 B2
(45) Date of Patent: Aug. 12, 2014

(54) TRACKING, DISTRIBUTION AND MANAGEMENT OF APPORTIONABLE LICENSES GRANTED FOR DISTRIBUTED SOFTWARE PRODUCTS

(75) Inventors: David Bantz, Portland, ME (US); Thomas E. Chefalas, Somers, NY (US); Rick A. Hamilton, II, Charlottesville, VA (US); Srikant Jalan, Cortlandt Manor, NY (US); Steven J. Mastrianni, Unionville, CT (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1434 days.

(21) Appl. No.: 11/616,692

(22) Filed: Dec. 27, 2006

(65) Prior Publication Data
US 2008/0162360 A1 Jul. 3, 2008

(51) Int. Cl.
*G06Q 99/00* (2006.01)
*G06Q 20/00* (2012.01)

(52) U.S. Cl.
CPC .......... *G06Q 20/00* (2013.01); *G06Q 2220/18* (2013.01)
USPC .............................................. 705/59; 705/51

(58) Field of Classification Search
USPC ..................................................... 705/51, 59
See application file for complete search history.

(56) References Cited

U.S. PATENT DOCUMENTS

| 5,862,228 | A | | 1/1999 | Davis | |
|---|---|---|---|---|---|
| 5,889,881 | A | | 3/1999 | MacAulay et al. | |
| 5,892,900 | A | * | 4/1999 | Ginter et al. | 726/26 |
| 5,920,589 | A | | 7/1999 | Rouquette et al. | |
| 6,026,174 | A | | 2/2000 | Palcic et al. | |
| 6,072,493 | A | * | 6/2000 | Driskell et al. | 715/854 |
| 6,400,996 | B1 | | 6/2002 | Hoffberg et al. | |
| 6,418,424 | B1 | | 7/2002 | Hoffberg et al. | |
| 6,449,368 | B1 | | 9/2002 | Davis et al. | |
| 6,542,620 | B1 | | 4/2003 | Rhoads | |
| 6,546,811 | B2 | | 4/2003 | Fincke | |
| 6,636,847 | B1 | | 10/2003 | Spires | |
| 6,691,093 | B2 | * | 2/2004 | Shell | 705/26.8 |
| 7,249,382 | B2 | * | 7/2007 | Kawell et al. | 726/27 |
| 7,720,767 | B2 | * | 5/2010 | Ta et al. | 705/59 |
| 8,489,645 | B2 | * | 7/2013 | Mihaila et al. | 707/802 |
| 8,561,210 | B2 | * | 10/2013 | Vrielink et al. | 726/29 |
| 8,583,741 | B2 | * | 11/2013 | Perlow et al. | 709/206 |
| 2004/0098602 | A1 | * | 5/2004 | DeTreville et al. | 713/193 |
| 2004/0122734 | A1 | * | 6/2004 | Schleicher et al. | 705/14 |
| 2005/0075943 | A1 | * | 4/2005 | Potsch et al. | 705/26 |
| 2005/0220296 | A1 | * | 10/2005 | Kawell et al. | 380/1 |
| 2007/0094145 | A1 | * | 4/2007 | Ta et al. | 705/59 |
| 2007/0112678 | A1 | * | 5/2007 | Himelfarb | 705/51 |
| 2008/0010113 | A1 | * | 1/2008 | Lanter et al. | 705/14 |

* cited by examiner

*Primary Examiner* — James D Nigh
(74) *Attorney, Agent, or Firm* — Yee & Associates, P.C.; Arthur J. Samodovitz (57) ABSTRACT

A computer controlled implementation for distributing portions of a license to use software entities, granted by a licensor to a primary licensee, to subsequent secondary licensees comprising determining a dividable value for the primary license to use a software entity, enabling the primary licensee to grant a portion of the dividable value of the primary license to use the software entity to a secondary licensee, enabling the licensor, the licensee and the secondary licensee to add value to said values of the licenses and tracking said value of the license and of the portion granted to said secondary licensee.

10 Claims, 7 Drawing Sheets

TRACKING, DISTRIBUTION AND MANAGEMENT OF APPORTIONABLE LICENSES GRANTED FOR DISTRIBUTED SOFTWARE PRODUCTS

TECHNICAL FIELD

The present invention relates to a distribution and management implementation for licenses granted to the purchasers and users of computer software products that facilitate the acquisition and use of such software products.

BACKGROUND OF RELATED ART

The past generation has been marked by a rapid expansion of industries involved in the marketing and distribution of virtually all products over the Internet or World Wide Web (Web)(terms are used interchangeably herein) or like networks. With the expanded accessibility of hundreds of thousands of programmers, information distributors and users of such programs via the expanded network client bases, an obvious need became apparent: the need for software product distribution channels that would compensate the developers and distributors of the software products without hampering the ability of the software product distributes, i.e. purchasers using the software products to their fullest advantage.

Conventionally, software licensing is the means through which software developers and vendors control the use and cost of their software products. Accordingly, for software product developers to maintain reasonable profit margins, it is essential for these developers who license the use of the software products to control the use and distribution of such licensed software products. Software developers and vendors have tried to forcibly control the licensed use of the software products with features such as nonreusable recording media and machine lock keys. These techniques harassed and offended consumers using the product and had become unexpected impediments to the software usage that would often crop up even during authorized and proper use of the software products.

SUMMARY OF THE PRESENT INVENTION

The present invention provides an implementation that enables a licensee of an accessed or purchased software product to apportion and redistribute the received license as his business needs arise in a dynamic process that ensures the protection of the developers profit while maximizing the flexibility of the licensee in using the licensed software product for his business needs. The invention also provides the licensee with means for dynamically acquiring additional value for his license, which he may then distribute to others implementing his business needs.

The claimed invention, thus, provides a computer controlled implementation for distributing portions of a license to use software entities, granted by a licensor to a primary licensee, to subsequent secondary licensees comprising determining a dividable value for the primary license to use a software entity, enabling the primary licensee to grant a portion of the dividable value of the primary license to use the software entity to a secondary licensee, enabling the licensor, the licensee and the secondary licensee to add value to the values of the licenses and tracking the value of the license and of the portion granted to said secondary licensee.

Because the distribution of licenses to secondary licensees provides an additional benefit to the developer of the software product in that it exposes the software product to additional potential purchasers, the developer is additionally enabled to add value to the value of the primary license whenever the primary licensee assigns a portion of his license to a secondary licensee.

License values are generally determined by two factors: the duration or time period of the license and the cost per unit of time.

The invention has provision for enabling a secondary licensee to grant a portion of the dividable value of the secondary license to use the software entity to a subsequent licensee.

The value of both the primary and subsequent licenses may be affected by the number of people of overall licensees who license a particular licensed software entity. Thus, provision may be made for automatically changing any or all values of primary, secondary and subsequent licenses based upon predetermined changes in this number set up as events triggering such automatic changes.

The invention also provides for enabling the selective display of the values of each of the licenses to each of the licensees. This may be conveniently implemented by forming a displayable hierarchy including a primary node representing the primary licensee, at least one secondary node representing at least one secondary licensee and a subsequent node for each subsequent licensee enabling the display of the value of each license in association with the node representing each licensee.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 9 is a block diagram of a basic generalized data processing system including a central processing unit (CPU)

that may be used at a receiving or server terminal to provide the implementation of this invention for the apportioning and tracking of software licenses;

DETAILED DESCRIPTION OF THE PREFERRED EMBODIMENT

Figure 1:
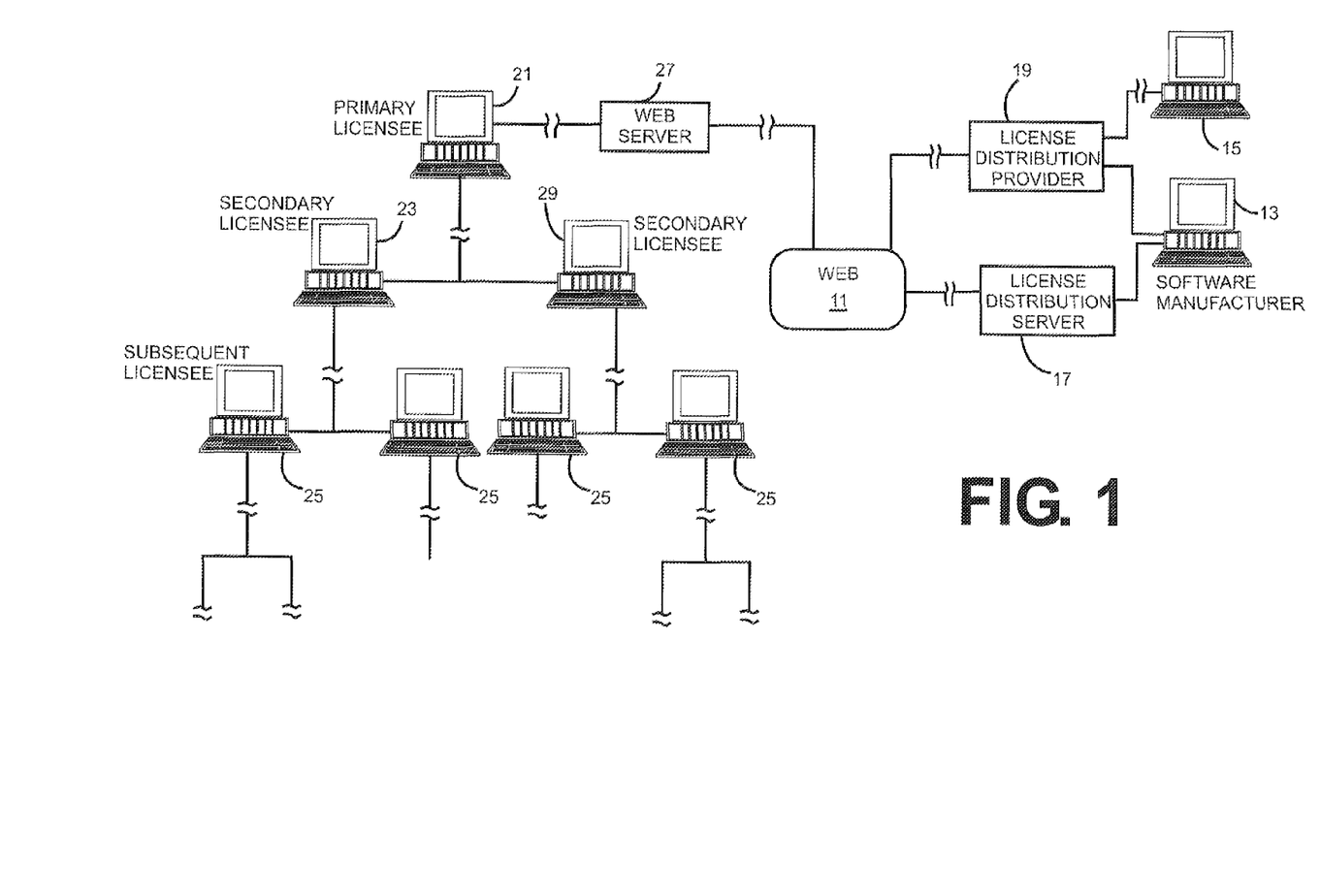
FIG. 1 is a block diagram of a generalized view of a network set up for the distribution of licensed software products on which the apportionable license distribution and tracking of the present invention may be implemented.

Referring to FIG. 1, there is shown a diagram of a generalized view of a network set up for the distribution of licensed software products on which the apportionable license distribution and tracking of the present invention, as will be subsequently described with respect to FIGS. 3 through 8, may be implemented. The illustrative distribution network shown is the Web 11, which is the most common network used for software entity license distribution. However, any network, both public or private, may be used. The software entities being distributed are program products. However, such software entities may be entertainment software, e.g. access to distribution sites such as chess or poker rooms, educational facilities, e.g. libraries, or even movie channels. The software entity may be any digitized file including digitized movies, images and literary material subject to licensing. The invention can cover the distribution of any software entity for which a license is granted that has a determinable dividable value, e.g. a period of n months @ $m per month=v (value).

The source of the software entities 13 and 15 are the manufacturers or developers who distribute their software products over the Web to a primary licensee 21 over established channels. The developers or manufacturers at sources 13 and 15 may distribute through a provider service 19 that will distribute the licenses and track the value of the distributed licenses including the apportioned licenses to secondary and subsequent licensees, as will be hereinafter described. This provider service may be performed by a trans-vendor service bureau. Of course, a manufacturer or software developer 13 may do such extensive licensing that it does its own distribution through a licensing management server system 17. In either distribution method, the tracking for the source is carried out by servers provided at the distribution points 17 and 19. To track the apportioning of a license for a software product with a dividable value, a primary licensee at computer terminal 21 accesses a license from a source 15 through Web server 27. Since the license for the software entity provided has a dividable value, primary licensee 21 may apportion a definable portion of the license to a secondary licensees at computer terminals 23 and 29 who, in turn, have the capability of further apportionment of the secondary license values to subsequent licensees at computer terminals 25.

Referring now to FIGS. 2 through 6, there will be described an illustrative apportioning of a primary software entity license into several secondary and subsequent licenses with tracking of the dynamically changing values of the primary and secondary and subsequent licenses. The data shown in FIGS. 2 through 6 is displayable and may be displayed when requested on source terminals 13 and 15 (FIG. 1), any display terminals associated with providers or servers 19 or 17, as well on any of the licensee terminals 21, 23, 29 and 25. On the licensee terminals, the data that may be displayable will be limited to data pertinent to the particular licensee.

Figures 2, 3:
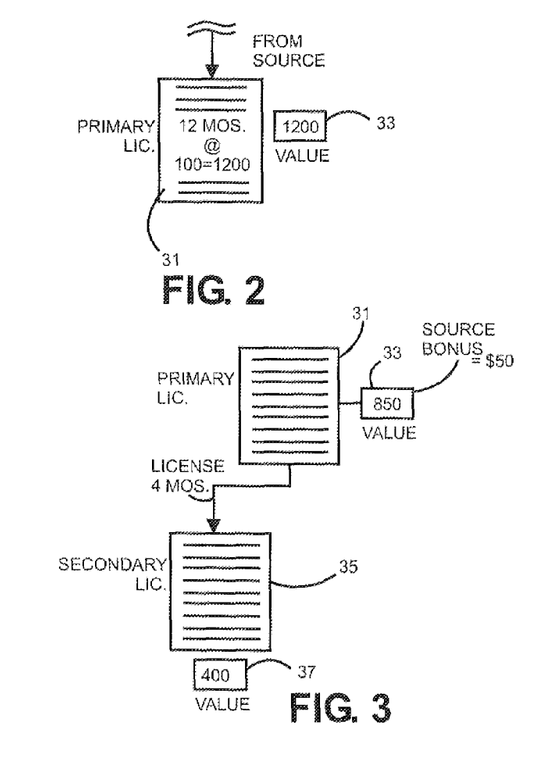
FIG. 2 shows the initial stage of a displayable hierarchy, showing the original primary license, for tracking the apportioning of software licenses according to the present invention.
FIG. 3 is a subsequent stage of the hierarchy of FIG. 2 showing the tracking of the value of the primary and a secondary license apportioned from the primary license after the granting of the secondary license.
Figure 4:
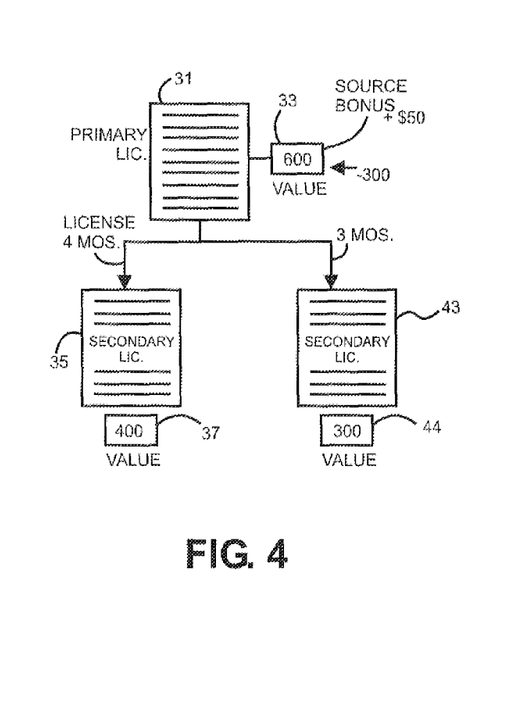
FIG. 4 is a subsequent stage of the hierarchy of FIG. 3 showing the tracking of the value of the primary and secondary licenses apportioned from the primary license after the granting of a further secondary license.

Returning now to FIG. 2, the primary license 31, from a source on the Web, has a value 33 of $1,200 (12 months @ $100/month). In FIG. 3, the primary licensee 31 has granted a portion (4 months) to a secondary licensee 35. The value 37 of this secondary license is shown to be 400. The value of the primary license is thus reduced to 800. However, the licensed software entity developer, in order to encourage proliferation of his software entity has offered to pay $50 as an incentive for the granting of secondary licenses. Thus, the value 33 of the primary license is increased to 850. Continuing the license apportionment in FIG. 4, the primary licensee 31 has granted another portion (3 months) to another secondary licensee 43. The value 44 of this secondary license is shown to be 300. The value of the primary license is thus reduced to 550. However, another $50 incentive bonus for the other secondary license raises the value 33 to 600.

Figure 5:
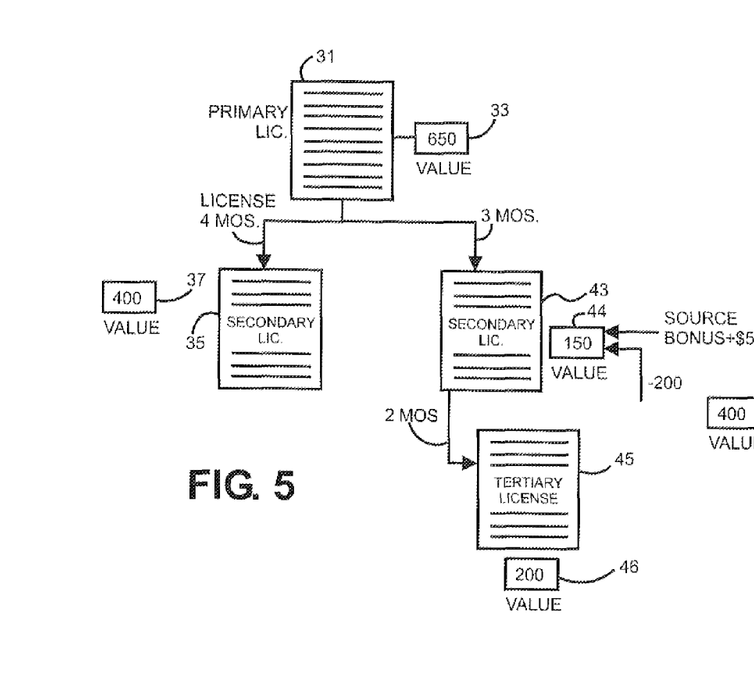
FIG. 5 is a subsequent stage of the hierarchy of FIG. 4 showing the tracking of the value of the primary licensee, the secondary licensee and a subsequent tertiary license apportioned from the secondary license after the granting of the tertiary license.

Continuing now with respect to FIG. 5 the secondary licensee 43 has granted a portion (2 months) to a tertiary licensee 45. The value 46 of this tertiary license is shown to be 200. The value of the secondary license is thus reduced to 100. However, an incentive bonus of $50 raises the value 44 to 150.

Figure 6:
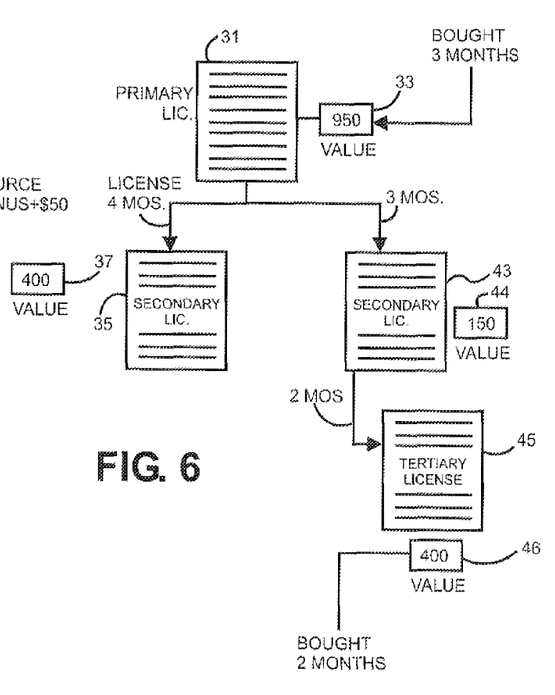
FIG. 6 is a subsequent stage of the hierarchy of FIG. 5 after additional license value has been purchased and added to some of the licenses.

Any of the primary, secondary and subsequent licensees may purchase additional value for their respective licenses. In the illustration of FIG. 6, the primary licensee 31 has purchased $300 in value to raise its value 33 to 950, and the tertiary licensee 45 has purchased two months @ 100 per month to raise its value 46 to 400.

Figure 7:
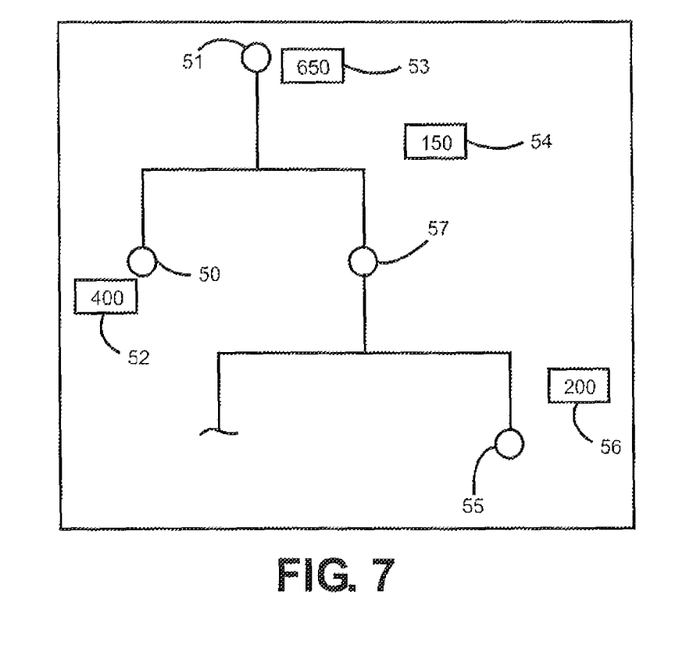
FIG. 7 is a simplified displayable hierarchy available to licensees and licensors showing the values of primary, secondary and subsequent licenses.
Figure 8:
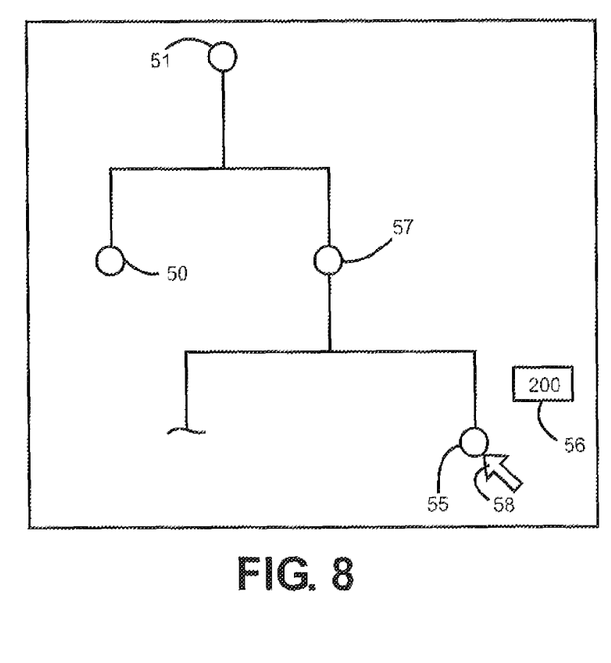
FIG. 8 is the displayable hierarchy of FIG. 7 in an embodiment wherein the values of each license are hidden are until requested.

As stated hereinabove, any source provider and licensee may access data from the displayable apportionment, distribution and value hierarchical tree. A typical simplified tree is shown in FIG. 7 wherein a primary license node 51 has a value 53 of 650, a secondary license node 50 has value 52 of 400, another secondary license node 57 has value 52 of 150 and a tertiary license node 55 has value 56 of 200. FIG. 8 is the same displayed tree of FIG. 7 with the values hidden until selected by a cursor 58, e.g. node 55 with value 56 of 200.

Figure 9:
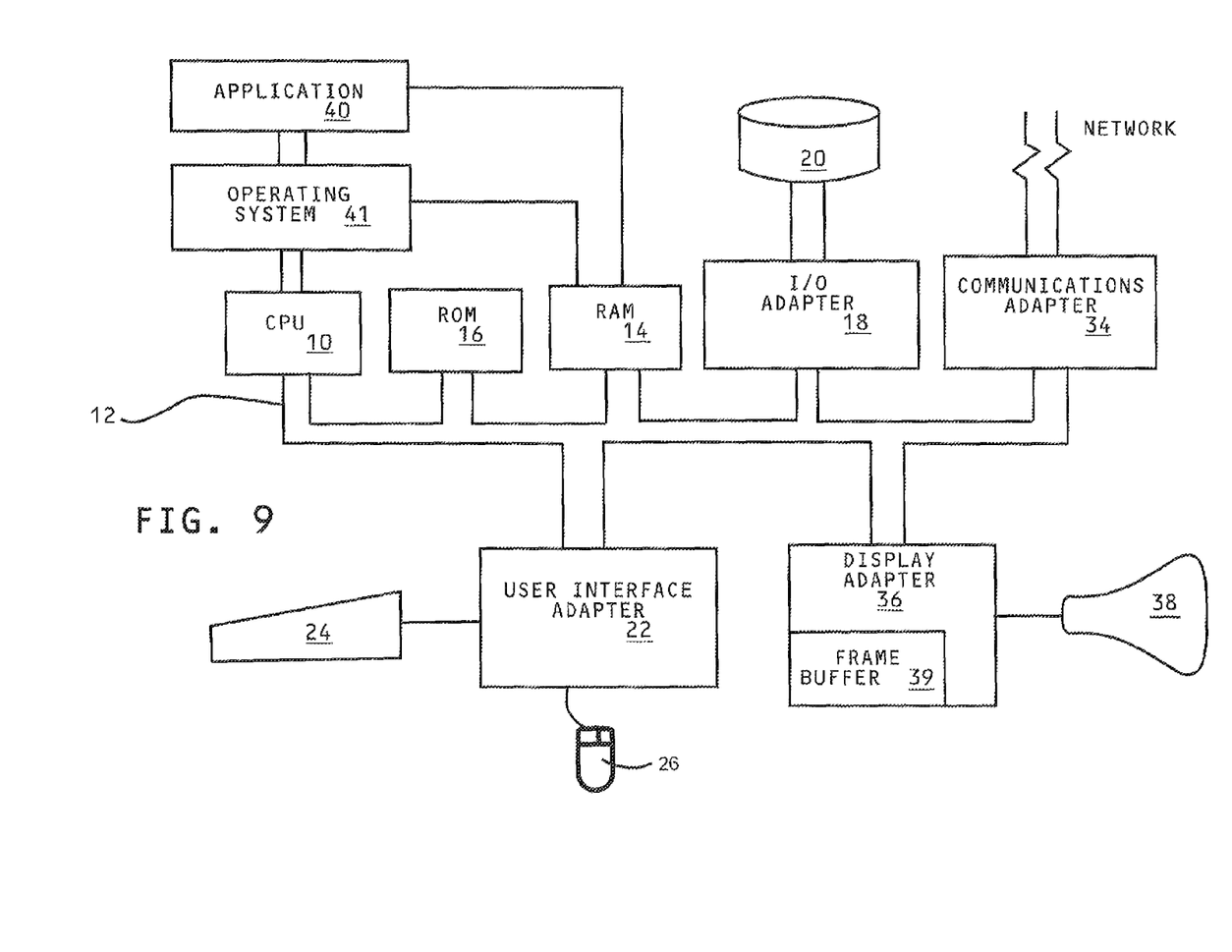

Reference is now made to FIG. 9 that represents a typical data processing display system that may function as the computer controlled display stations or terminals through which the participating users may request and acquire licenses and grant secondary and subsequent licenses to portions of the primary license. The system may function as the tracking and control system of the present invention operating in the environment of FIG. 1 in the servers of either license distribution provider 19 or license management 17. In FIG. 9, a central processing unit (CPU) 10, such as one of the PC microprocessors or workstations, e.g. System pSeries™ available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX™ operating system available from IBM; Microsoft's WindowsXP™, as well as various other UNIX and Linux operating systems. Application programs 40, controlled by the system, are moved into and out of the main memory Random Access Memory (RAM) 14. These programs include the programs of the present invention for the distribution of licensed software products on which an apportionable license may be granted, and the tracking of values of such licenses. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20 to provide the storage of the database of the present invention. Communications adapter 34 interconnects bus 12 with an outside network enabling the data processing system to communicate with other such systems over networks including the Web. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 10:
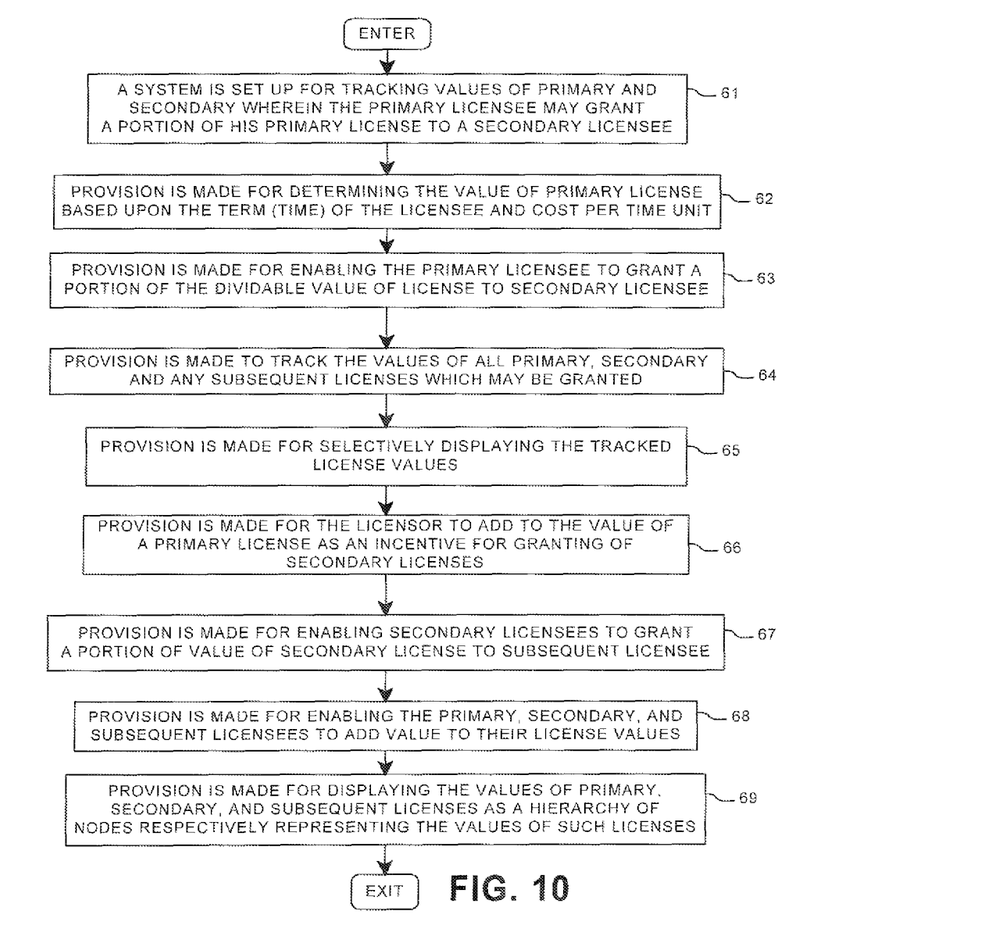
FIG. 10 is an illustrative flowchart describing the setting up of the elements of a program according to the present invention for the apportioning and tracking of software licenses.

FIG. 10 is a flowchart showing the development of a process according to the present invention for enabling a licensee of an accessed or purchased software product to apportion and redistribute the received license as his business needs arise in a dynamic process that insures the protection of the developers profit while maximizing the flexibility of the licensee in using the licensed software product for his business needs.

Provision is made for a method for tracking values of primary and secondary licenses wherein the primary licensee may grant a portion of the primary license to one or more secondary licensees, step 61. Provision is made for a determination of the value of the primary license based upon the term and cost per time unit, step 62. Provision is made for enabling the primary licensee to grant a portion of the primary license of dividable value to a secondary licensee, step 63. Provision is made to track the values of all primary, secondary and any subsequent licenses that may be granted, step 64. Provision is made for selectively displaying the tracked license values, 65. Provision is made for the licensor to add to the value of the primary license as an incentive for the granting of secondary licenses, step 66. Provision is made for enabling the secondary licensee to grant a portion of the secondary license of dividable value to a subsequent, e.g. tertiary licensee, step 67. Provision is made for enabling the primary, secondary and subsequent licensees to add to the value of their licenses, step 68. Provision is made for enabling the values of the primary, secondary and subsequent licenses to be displayed as a hierarchy of nodes respectively representing the values of their respective licenses, step 69.

Figure 11:
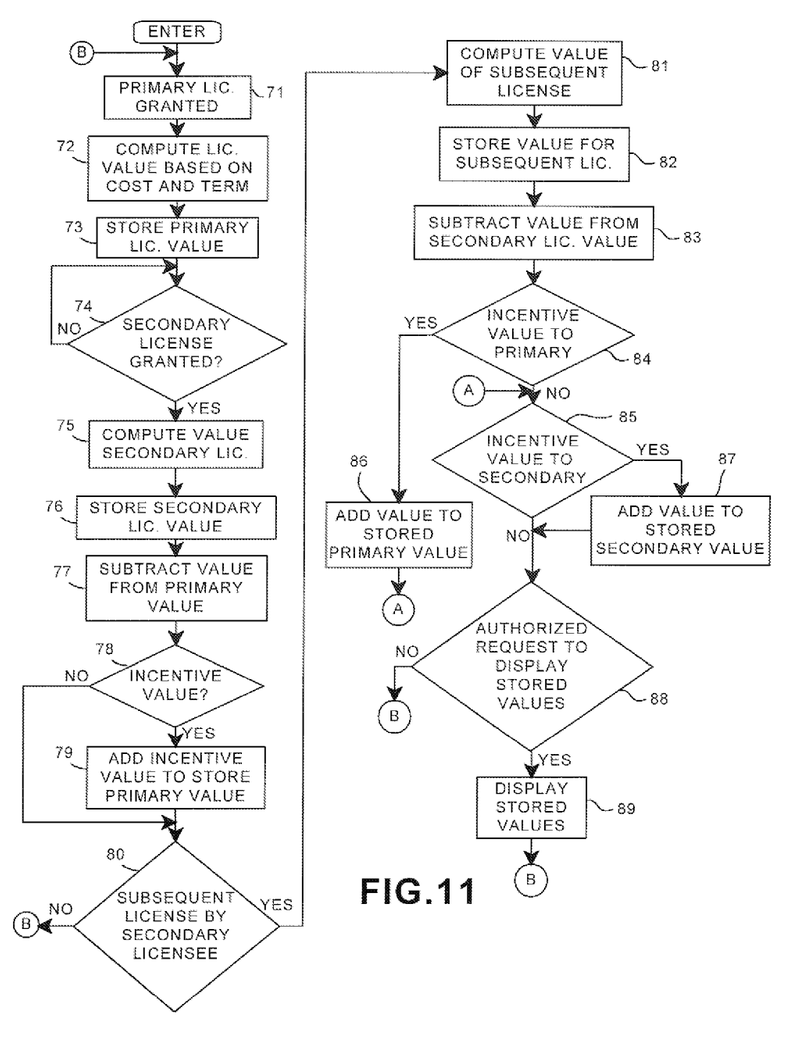
FIG. 11 is a flowchart of an illustrative run of the program set up in FIG. 10.

The running of the process set up in FIG. 10 will now be described with respect to the flowchart of FIG. 11. An initial primary license is granted, step 71. The license value is computed based upon term and unit cost, step 72. The primary license value is stored, step 74. A determination is then made as to whether a secondary license has been granted, step 74. If Yes, the value of the secondary license is computed, step 75, and this secondary license value is stored, step 76. This secondary value is subtracted from the primary license value, step 77. Then, a determination is made, step 78, as to whether this secondary license qualifies for incentives offered by the developer or manufacturer. If Yes, the incentive value is added to the primary license, step 79. Then, or if No, a determination is made as to whether any secondary licensee has granted a license to a portion of the value of the secondary license to any subsequent licensee, step 80. If No, the process is returned to initial step 11 via branch "B". If Yes, the value of the subsequent license is computed, step 81, and this subsequent license value is stored, step 82. This subsequent license value is subtracted from the secondary license value, step 83. Then, a determination is made, step 84, as to whether the primary licensee is entitled to any incentive value. If Yes, the incentive value is added to the primary value, step 86. Then, via branch "A" or if the determination in step 84 is No, a further determination is made, step 85, as to whether the secondary licensee qualifies for incentives offered by the developer or manufacturer. If Yes, step 87, the incentive value is added to the value of the secondary license.

At this point, or if the determination in step 85 is No, a determination may conveniently be made as to whether there is an authorized request to display the stored license values, step 88. If Yes, step 89, there is a display of the stored values as shown in steps 2 through 6, or simplified as shown in FIGS. 7 and 8. Next, or if there is a No determination in step 88, the process is returned via branch "B" to initial step 71.

Although certain preferred embodiments have been shown and described, it will be understood that many changes and modifications may be made therein without departing from the scope and intent of the appended claims.

What is claimed is:

1. A method for tracking sublicensing of a primary license, granted by a licensor to a primary licensee, to use a software program, the method comprising the steps of:

responsive to identifying, by a computer, a secondary license granted by the primary licensee to a secondary licensee to use the software program, the computer determining a unit cost for portions of the primary license based on a first term of the primary license and a first value of the primary license, the computer determining a second value of a second term of the secondary license based on the unit cost, the computer reducing a right under the primary license by reducing the first value of the primary license by the second value of the secondary license, wherein the first value of the primary license is represented and stored, by the computer, in a first data node for the primary license in a hierarchy of data nodes representing the primary license and sublicensed portions of the primary license, and representing and storing, by the computer, the second value of the second term of the secondary license in a second data node in the hierarchy, wherein the second data node is for the secondary license and the second data node is a child node of the first data node in the hierarchy.

2. The method of claim 1, further comprising the steps of:
responsive to identifying, by the computer, the secondary license granted to the secondary licensee to use the software program by the primary licensee, along with reducing the first value of the primary license by the second value of secondary license, the computer also increasing the first value of the primary license by an amount based on a predetermined incentive for sublicensing the software program.

3. The method of claim 1, further comprising the steps of:
after representing and storing, by the computer, the second value of the second term of the secondary license in the second data node in the hierarchy, the computer displaying (a) the hierarchy with the first data node representing the primary licensee and the second data node representing the secondary licensee in association with the primary licensee, and (b) in association with the first data node, the first value of the primary license and (c) in association with the second data node, the second value of the secondary license.

4. The method of claim 3, wherein the step of the computer displaying in association with the first data node, the first value of the primary license, is in response to the computer receiving a first user input selecting the first data node, and wherein the step of the computer displaying in association with the second data node, the second value of the secondary license, is in response to the computer receiving a second user input selecting the second data node.

5. A computer system for tracking sublicensing of a primary license, granted by a licensor to a primary licensee, to use a software program, the computer system comprising:
one or more processors, one or more computer readable memories and one or more computer readable storage devices; and
first program instructions to identify a secondary license granted by the primary licensee to a secondary licensee to use the software program, and in response determine a unit cost for portions of the primary license based on a first term of the primary license and a first value of the primary license, determine a second value of a second term of the secondary license based on the unit cost, reduce a right under the primary license by reducing the value of the primary license by the second value of the secondary license, wherein the first value of the primary license is represented and stored, by the computer, in a first data node for the primary license in a hierarchy of data nodes representing the primary license and sublicensed portions of the primary license, and represent and store the second value of the second term of the secondary license in a second data node in the hierarchy, wherein the second data node is for the secondary license and the second data node is a child node of the first data node in the hierarchy, wherein the first program instructions are stored on the one or more computer readable storage devices for execution by the one or more processors via the one or more computer readable memories.

6. The computer system of claim 5, further comprising:
second program instructions to increase the first value of the primary license by an amount based on a predetermined incentive for sublicensing the software program, in response to identifying the secondary license granted to the secondary licensee to use the software program by the primary licensee, wherein the second program instructions are stored on the one or more computer readable storage devices for execution by the one or more processors via the one or more computer readable memories.

7. The computer system of claim 5, further comprising:
second program instructions to display (a) the hierarchy with the first data node representing the primary licensee and the second data node representing the secondary licensee in association with the primary licensee, and (b) in association with the first data node, the first value of the primary license and (c) in association with the second data node, the second value of the secondary license, wherein the second program instructions are stored on the one or more computer readable storage devices for execution by the one or more processors via the one or more computer readable memories.

8. A computer program product for tracking sublicensing of a primary license, granted by a licensor to a primary licensee, to use a software program, to use a software program product, the computer program product comprising:
one or more non-transitory computer readable storage devices, and program instructions stored on at least one or more of the devices, the program instructions comprising:
program instructions, responsive to identifying a secondary license granted by the primary licensee to a secondary licensee to use the software program, for determining a unit cost for portions of the primary license based on a first term of the primary license and a first value of the primary license, determining a second value of a second term of the secondary license based on the unit cost, reducing a right under the primary license by reducing the first value of the primary license by the second value of the secondary license, wherein the first value of the primary license is stored in a first data node for the primary license in a hierarchy of data nodes representing the primary license and sublicensed portions of the primary license, and representing and storing the second value of the second term of the secondary license in a second data node in the hierarchy, wherein the second data node is for the secondary license and the second data node is a child node of the first data node in the hierarchy.

9. The computer program product of claim 8, further comprising:
program instructions, stored on at least one of the one or more storage devices, for increasing the first value of the primary license by an amount based on a predetermined incentive for sublicensing the software program product, in response to identifying the secondary license granted to the secondary licensee to use the software program product by the primary licensee.

10. The computer program product of claim 8, further comprising:
program instructions, stored on at least one of the one or more storage devices, for displaying (a) the hierarchy with the first data node representing the primary licensee and the second data node representing the secondary licensee in association with the primary licensee, and (b) in association with the first data node, the first value of the primary license and (c) in association with the second data node, the second value of the secondary license.

* * * * *